United States Patent [19]
Uemura

[11] Patent Number: 5,741,974
[45] Date of Patent: Apr. 21, 1998

[54] PRESSURE SENSOR WITH RESONANT VIBRATION PREVENTING MEANS

[75] Inventor: Fumito Uemura, Himeji, Japan

[73] Assignee: Mitsubishi Denki Kabushiki Kaisha, Tokyo, Japan

[21] Appl. No.: 12,401

[22] Filed: Feb. 2, 1993

[30] Foreign Application Priority Data

Feb. 4, 1992 [JP] Japan ................... 4-019126

[51] Int. Cl.[6] ........................................ G01L 7/08
[52] U.S. Cl. ................ 73/706; 73/727; 73/726; 73/115; 338/42
[58] Field of Search ............... 73/706, 721, 720, 73/726, 727, 723, 115; 338/4, 42

[56] References Cited

U.S. PATENT DOCUMENTS

| 5,161,415 | 11/1992 | Kodama et al. | 73/706 X |
| 5,212,989 | 5/1993 | Kodama et al. | 73/706 |
| 5,222,397 | 6/1993 | Kodama | 73/706 X |

FOREIGN PATENT DOCUMENTS 68036  7/1991  Japan .

Primary Examiner—George M. Dombroske
Assistant Examiner—Joseph L. Felber
Attorney, Agent, or Firm—Sughrue, Mion, Zinn, Macpeak & Seas, PLLC

[57] ABSTRACT

A pressure sensor comprising a hollow main body (1) defining a bore (3) extending therethrough. A pressure sensing assembly (12) is disposed within the bore (3) to divide it into a detection cavity (3a) for transmitting therethrough the pressure to be detected at a pressure receiving end (3c) thereof and an output cavity (3b) through which an output signal from the pressure sensing assembly (12) is to be supplied. A flexible metal diaphragm (40) is attached to the main body (1) at the pressure receiving end (3c) to seal the detection cavity (3a) in which a pressure transmitting medium (11) is filled. The flexible metal diaphragm (40) has a resonance frequency above an oscillation frequency range of the pressure to be detected. Preferably, the effective diameter of the diaphragm (40) may be from 7.5 mm to 8.5 mm and the thickness dimension thereof may be from 35 µm to 45 µm.

3 Claims, 2 Drawing Sheets

PRESSURE SENSOR WITH RESONANT VIBRATION PREVENTING MEANS

BACKGROUND OF THE INVENTION

This invention relates to a pressure sensor and, more particularly, to a pressure sensor for use in detecting a fluid pressure such as a combustion pressure and an air pressure in which a pressure transmitting liquid medium is filled between a pressure sensing assembly and a flexible metal diaphragm.

FIG. 2 illustrates one example of a known pressure sensor for use in an automotive internal combustion engine to detect a gas pressure within a combustion chamber thereof. In FIG. 2, the pressure sensor comprises a generally cylindrical hollow case main body 1 made of a stainless steel such as SUS 304 standardized by Japanese Industrial Standard (JIS) to be attached to an engine (not shown) at a threaded portion 2. The case main body 1 has a generally cylindrical central bore 3 formed therein and extending through the entire length of the case main body 1. At the middle portion of the central bore 3, the shoulder portion 1a is formed for attaching a pressure sensing assembly 12. The pressure sensing assembly 12 divides the central bore 3 into a detection cavity 3a for transmitting therethrough a pressure received at a pressure receiving end 3c thereof and an output cavity 3b through which an output signal from the pressure sensing assembly 12 is to be supplied.

The pressure sensing assembly 12 comprises a stem 7 made of mild-steel and attached to the shoulder portion 1a, a glass mounting bed 6 bonded to the stem 7, a pressure sensing element 5 attached to the mounting bed 6, signal lines 8 electrically connected to the pressure sensing element 5 by bonding wires 9 and a molding resin 10. For the pressure sensing element 5 a semiconductor strain gage is suitable. The signal lines 8 are upwardly extending through the stem 7 from the detecting cavity 3a to the output cavity 3b and supported and sealed by sealant 7a filled between the stem 7 and the signal line 8. The molding resin 10 integrally molds the pressure sensing element 5, the mounting bed 6, the stem 7, the signal line 8 and the whole of the bonding wires 9. The stem 7 integrally molded is welded to the case main body 1 at the shoulder portion 1a thereof. A slightly and continuously corrugated flexible metal diaphragm 4 made of a stainless steel such as SUS 304 is hermetically welded at its periphery to the surrounding outer edge of the pressure receiving end 3c of the case main body 1 to seal the detection cavity 3a filled with a pressure transmitting medium 11 such as a silicone oil for transmitting a pressure received at the diaphragm 4. The flexible diaphragm 4 has a thickness dimension of 30 μm and an effective diameter of 8 mm. The effective diameter is a diameter of a portion of the diaphragm 4 contacted with the pressure transmitting medium 11 to receive and transmit the pressure to be detected. In this known pressure sensor, since the one of the surfaces of the diaphragm 4 is in contact with the pressure transmitting medium 11 at its entirety, the effective diameter is substantially equal to the outer diameter of the diaphragm 4.

In operation, the pressure receiving end 3c having the diaphragm 4 is disposed within a combustion chamber of an engine or disposed within a connecting tube leading to a combustion chamber. According to the pressure fluctuation within the combustion chamber, the diaphragm 4 is bent to transmit the pressure fluctuation through the transmitting medium 11 to the pressure sensing element 5. The transmitted pressure fluctuation is converted into an electric signal at the pressure sensing element 5. The electric signal is outputted outwardly by the signal lines 8 through the bonding wires 9.

In the conventional pressure sensor as described above, the diaphragm 4 has the thickness dimension of 30 μm and the effective diameter of 8 mm. The resonance frequency thereof is from 8500 Hz to 8600 Hz. On the other hand, an oscillation frequency within the combustion chamber of the internal combustion engine is from 5000 Hz to 9000 Hz. Therefore, the resonance phenomena easily occurs on the flexible diaphragm 4 and the flexible diaphragm 4 may crack and break.

SUMMARY OF THE INVENTION

Accordingly, one object of the present invention is to provide a pressure sensor free from the above-discussed problems of the conventional pressure sensor.

Another object of the present invention is to provide a pressure sensor in which the flexible diaphragm has a resonance frequency for preventing a resonance phenomena.

A further object of the present invention is to provide a pressure sensor in which the diaphragm is kept from cracking.

With the above objects in view, the pressure sensor of the present invention comprises a flexible diaphragm having a resonance frequency above an oscillation frequency range of the pressure to be detected to prevent a resonance phenomena. The diaphragm has an effective diameter and thickness dimension effective for exhibiting the resonance frequency above the osillation frequency range of the pressure to be detected. Preferably, the effective diameter of the diaphragm may be from 7.5 mm to 8.5 mm and the thickness dimension thereof may be from 35 μm to 45 μm.

In the pressure sensor of the present invention, the thickness dimension of the diaphragm is thicker than that of the conventional pressure sensor. The resonance frequency of the diaphragm therefore becomes higher than the oscillation frequency range of the pressure to be detected. As the resonance phenomena does not occur, a crack and damage in the diaphragm can be prevented.

BRIEF DESCRIPTION OF THE DRAWINGS

The present invention will become more readily apparent from the following detailed description of the preferred embodiment of the present invention taken in conjunction with the accompanying drawings, in which.

DESCRIPTION OF THE PREFFERED EMBODIMENT

Figure 1:
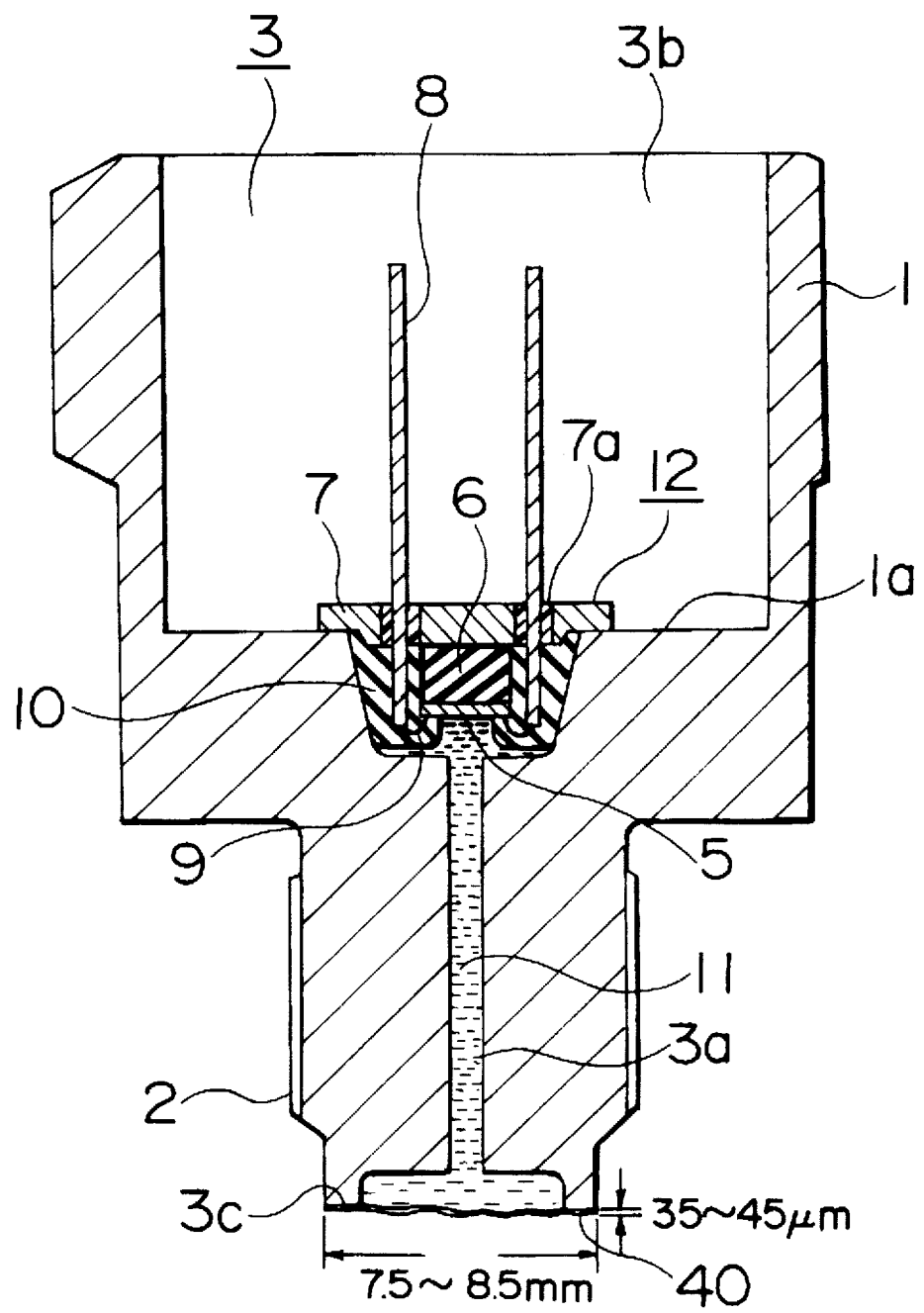
FIG. 1 is a sectional view of an embodiment of the pressure sensor of the present invention.
Figure 2:
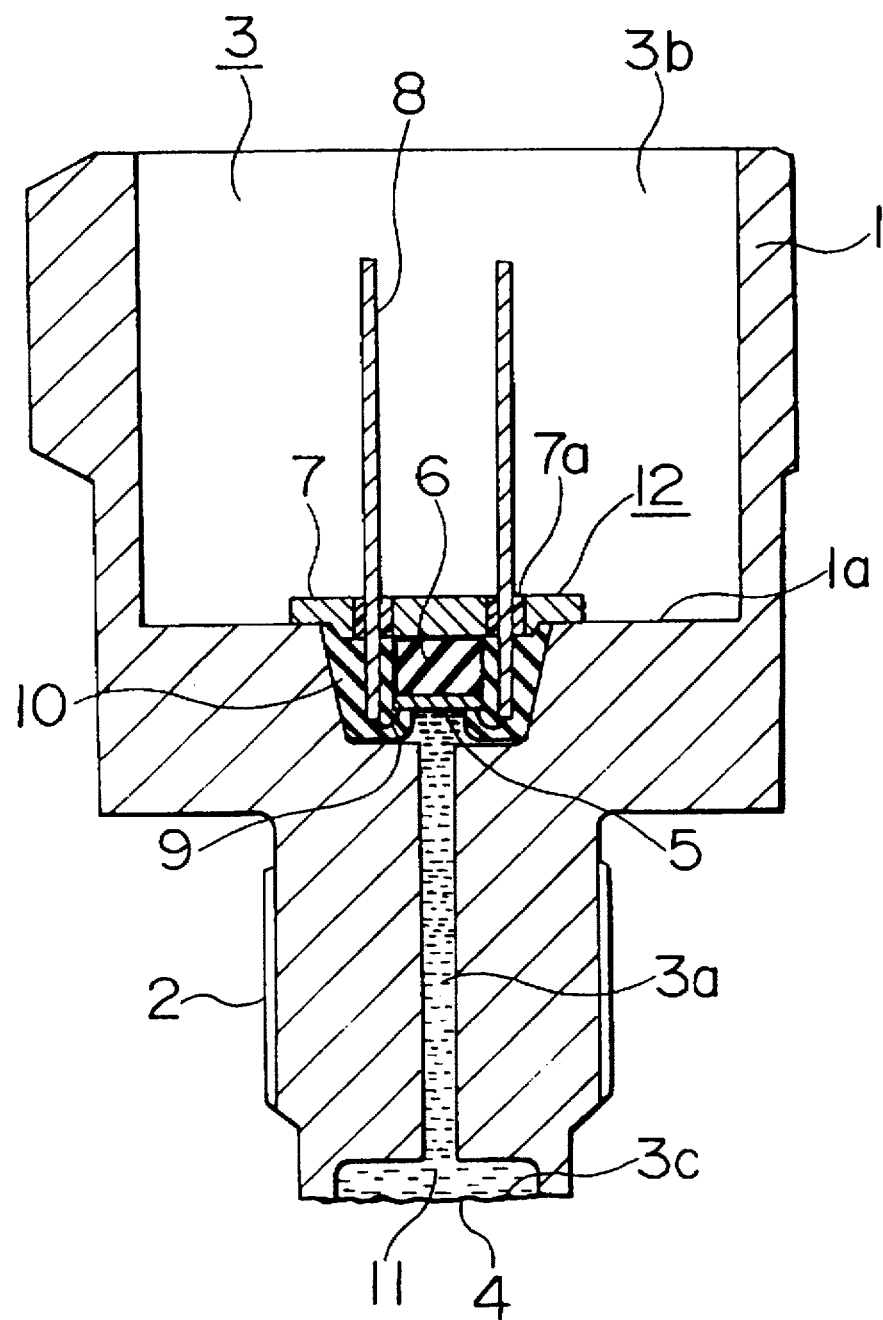
FIG. 2 is a sectional view of a known pressure sensor.

FIG. 1 illustrates an embodiment of the pressure sensor of the present invention to be attached to an engine (not shown), which has basically the same structure as the conventional pressure sensor illustrated in FIG. 2 but is different in a point about the size of the flexible diaphragm. The pressure sensor of the present invention comprises a substantially cylindrical hollow main body 1 defining a bore 3 extending therethrough. A pressure sensing assembly 12 is disposed within the bore 3 of the main body 1 and divides the bore 3 into a detection cavity 3a for transmitting therethrough the pressure to be detected at a pressure receiving end 3c of the bore 3 and an output cavity 3b through which an output signal from the pressure sensing assembly 12 is to be supplied. As the pressure sensing assembly 12 has the same structure as that of the conventional pressure sensor, a description about it is omitted. A flexible metal diaphragm 40 having the same corrugation as that of the conventional pressure sensor is welded and attached to the main body 1 at the pressure receiving end 3c of the detection cavity 3a to seal the detection cavity 3a in which a pressure transmitting medium 11 such as a silicone oil is filled.

A resonance frequency f of a flexible plain-disk shaped diaphragm with no corrugations, which is securely supported at a surrounding outer edge thereof is shown by $$f = \left( \frac{10.21}{2\pi r^2} \sqrt{\frac{E}{12(1-v^2)\rho}} \right) t \qquad (1)$$

r: efective radius   E: Young's modulus,
v: Poisson's ratio,   ρ: density as a function of a thickness dimension t thereof. The resonance frequency f is in proportion to the thickness dimension t. The relationship between the resonance frequency f and the thickness dimension t holds in the flexible diaphragm 40 of the present invention basically. When the thickness dimension t is made greater, the resonance frequency f becomes higher.

Under the practical operation, however, a thermal expansion of a silicone oil during for example attachment to an engine causes an initial stress against a surface of the flexible diaphragm 40. As a thermal expansion quantity of the silicone oil is constant, the greater the thickness dimension t of the flexible diaphragm 40 is, the harder the initial stress becomes, and the flexible diaphragm 40 may brack because of the initial stress if the thickness dimension t is too thick.

A critical value of the thickness dimension t can be gained by the numerical analysis. Here, the effective radius r of the flexible diaphragm 40 also should be taken into consideration because the flexible diaphragm 40 with a small effective radius r becomes disadvantageous to stresses. As a result that a critical value of the effective diameter is calculated by the stress analysis, it needs to be above 7.5 mm. When the effective diameter is 7.5 mm, the upper critical value of the thickness dimension t is 45 μm from the result of the stress analysis on the finite element method. When the thickness dimension t becomes over 45 μm, a stress over a fatigue limit is added to the flexible diaphragm 40. For the flexible diaphragm 40 of the present invention with the continuous-corrugation, as the result of the eigen value analysis on the finite element method in consideration of the continuous-corrugation thereof, within the bounds under 45 μm thick, based on the above expression (1) for the plain disk not-corrugated diaphragm, the effective diameter should be from 7.5 mm to 8.5 mm and the thickness dimension t should be from 35 μm to 45 μm effective for exhibiting the resonance frequency above the pressure oscillation frequency range of 5,000 Hz to 9,000 Hz and preventing a resonance phenomena thereof. The flexible diaphragm 40 exhibits therefore from 9000–15000 Hz which is well above an oscillation frequency range of the pressure of 5000–9000 Hz within the combustion chamber of the internal combustion engine. The resonance phenomena therefore does not occur and the initial stress is also under the fatigue limit.

The above embodiment is shown a case that the pressure sensor of the present invention is attached to an automotive internal combustion engine to receive a combustion pressure within a combustion chamber, the pressure sensor of the present invention of course can be used to detect a lot of other fluid pressures such as an oil pressure, an air pressure and so on in various fields without the fear of breaking of the flexible diaphragm.

What is claimed is:

1. A pressure sensor for sensing a pressure within a cylinder of an internal combustion engine, comprising:

a hollow main body defining a bore extending therethrough and adapted to be mounted to an engine cylinder;

a pressure sensing assembly disposed within said bore of said main body and dividing said bore into a detection cavity for transmitting therethrough the pressure to be detected at a pressure receiving end thereof disposed in communication with an interior of the cylinder and an output cavity through which an output signal from said pressure sensing assembly is to be supplied;

a flexible metal diaphragm attached to said main body at said pressure receiving end of said detection cavity for sealing said detection cavity;

a pressure transmitting medium filled within said detection cavity; and means for preventing resonant vibrations of the flexible metal diaphragm due to oscillations of the pressure being detected, said preventing means comprising said flexible metal diaphragm being configured and dimensioned to have a resonance frequency above an oscillation frequency range of the pressure to be detected.

2. A pressure sensor as claimed in claim 1, wherein said flexible diaphragm has an effective diameter and thickness dimension effective for exhibiting said resonance frequency above said pressure oscillation frequency range.

3. A pressure sensor as claimed in claim 1, wherein said flexible diaphragm has a thickness of from 35 μm to 45 μm and an effective diameter of from 7.5 mm to 8.5 mm.

* * * * *